United States Patent
Zhao et al.

(10) Patent No.: US 12,216,834 B2
(45) Date of Patent: Feb. 4, 2025

(54) HUMAN-COMPUTER INTERACTION MOVEMENT TRACK DETECTION METHOD, APPARATUS, DEVICE, AND READABLE STORAGE MEDIUM

(71) Applicants: KINGFAR INTERNATIONAL INC., Beijing (CN); NANJING KINGFAR HEALTH TECHNOLOGY INC., Jiangsu (CN)

(72) Inventors: Qichao Zhao, Beijing (CN); Ran Yang, Beijing (CN)

(73) Assignees: KINGFAR INTERNATIONAL INC., Beijing (CN); NANJING KINGFAR HEALTH TECHNOLOGY INC., Jiangsu (CN)

(*) Notice: Subject to any disclaimer, the term of this patent is extended or adjusted under 35 U.S.C. 154(b) by 6 days.

(21) Appl. No.: 18/088,894

(22) Filed: Dec. 27, 2022

(65) Prior Publication Data
US 2024/0077954 A1    Mar. 7, 2024

(30) Foreign Application Priority Data
Sep. 3, 2022    (CN) .......................... 202211074471.8

(51) Int. Cl.
    *G06F 3/03*    (2006.01)
(52) U.S. Cl.
    CPC .................. *G06F 3/0304* (2013.01)
(58) Field of Classification Search
    CPC .................................................. G06F 3/0304
    See application file for complete search history.

(56) References Cited

U.S. PATENT DOCUMENTS

2015/0029092 A1*  1/2015  Holz ....................... G06F 3/017
                                                         345/156
2015/0044653 A1*  2/2015  Levine ................. G09B 23/288
                                                         434/262

FOREIGN PATENT DOCUMENTS

EP           3835924 A1      6/2021
WO    WO-2010100503 A2 *    9/2010    ......... G06F 3/04883

OTHER PUBLICATIONS

European Patent Office; European Search Report to Related Application No. EP22216994.8; Aug. 10, 2023; 4 Pgs.

* cited by examiner

*Primary Examiner* — Quan Zhen Wang
*Assistant Examiner* — Mancil Littlejohn, Jr.
(74) *Attorney, Agent, or Firm* — Cooper Legal Group, LLC

(57) ABSTRACT

Disclosed are a human-computer interaction movement track detection method, device, apparatus, and computer-readable storage medium. The method comprises: segmenting a movement path of a movement target to obtain one or more sub paths; monitoring and recording movement of the movement target in each of the sub paths to obtain a human-computer interaction movement track of the movement target in each of the sub paths; identifying the human-computer interaction movement track of the movement target in each of the sub paths with a determination model corresponding to each of the sub paths; and detecting a human-computer interaction movement track of the movement target based on identification of the human-computer interaction movement track in each of the sub paths.

7 Claims, 4 Drawing Sheets

HUMAN-COMPUTER INTERACTION MOVEMENT TRACK DETECTION METHOD, APPARATUS, DEVICE, AND READABLE STORAGE MEDIUM

CROSS-REFERENCE TO RELATED APPLICATION

This application claims the priority and benefit of Chinese patent application No. 202211074471.8, filed on Sep. 3, 2022. The entirety of Chinese patent application No. 202211074471.8 is hereby incorporated by reference herein and made a part of this specification.

TECHNICAL FIELD

Embodiments of the present application relate to the field of data detection, and more particularly, to a human-computer interaction movement track detection method, apparatus, device, and computer-readable storage medium.

BACKGROUND ART

In the field of human-computer interaction, the precise track determining and manipulation for movement targets are affected by various aspects, especially in the evaluation of human-computer interaction effectiveness, such as the comprehensive coordination ability of multi-channel information operators. Determining whether the movement target can move normally in the path, whether the movement target collides with the wall or moves out of the effective area is one of the important embodiments of monitoring and evaluating human-computer interaction effectiveness.

Most of the current wall-collision algorithms perform evaluation via sensor measurement method and dynamic balance evaluation method. Although the sensor measurement method can achieve a good detection effect, it needs to mount the sensing device on the movement target when it is detected. It will imperceptibly increase the accessible volume of the movement target, which is not applicable in some scenarios with a small accessible diameter or high precision. Although the sensor with a small volume will not greatly increase the accessible volume of the movement target, it is expensive and increases the economic cost additionally. The dynamic balance evaluation method indirectly reflects the measurement results according to the statistical indicators of the overall motion of movement targets, and cannot measure the collision results of movement targets in different areas.

SUMMARY

According to an embodiment of the present application, a human-computer interaction movement track detection solution is provided.

In a first aspect of the present application, a human-computer interaction movement track detection method is provided. The method comprises:
segmenting a movement path of a movement target to obtain one or more sub paths;
monitoring and recording movement of the movement target in each of the sub paths to obtain a human-computer interaction movement track of the movement target in each of the sub paths;
identifying the human-computer interaction movement track of the movement target in each of the sub paths with a determination model corresponding to each of the sub paths; and
detecting a human-computer interaction movement track of the movement target based on identification of the human-computer interaction movement track in each of the sub paths.

Further, the segmenting a movement path of a movement target to obtain one or more sub paths comprises:
segmenting the movement path with a pre-created json file to obtain one or more sub paths, wherein the pre-created json file contains definitions of various types of sub path.

By adopting the above-mentioned technical solution, it is easier to interpret and generate via a machine, and processing efficiency can be effectively improved.

Further the sub path comprises a regular sub path and a special figure path formed by combining various figures, the regular sub path comprising a circle, a triangle, a square, a trapezoid and/or a hexagon.

By using the above-mentioned technical solution, the scope of application of the present application is clarified, not only being applicable to regular sub path of various standards, but also being applicable to special figure paths formed by combining various figures.

Further, the identifying the human-computer interaction movement track of the movement target in each of the sub paths with a determination model corresponding to each of the sub paths comprises:
if the sub path is a trapezoid, partitioning the trapezoid according to each of vertex coordinates thereof to obtain a plurality of sub areas, and respectively identifying the human-computer interaction movement track of the movement target in each of the sub areas;
if the sub path is a circle, segmenting the circle into a plurality of segments equally, and determining shape and size of each segment according to a length, starting radian and ending radian of each segment; identifying the human-computer interaction movement track of the movement target based on the shape and size of each segment;
if the sub path is a triangle, partitioning the triangle according to each of vertex coordinates of the triangle to obtain a plurality of sub areas, and identifying the human-computer interaction movement track of the movement target according to the plurality of sub areas;
if the sub path is a square, partitioning the square into a plurality of rectangular areas, and respectively identifying the human-computer interaction movement track of the movement target in each rectangular area; and
if the sub path is a special figure path, segmenting the special figure path into a plurality of regular sub paths; partitioning the plurality of regular sub paths according to the determination model corresponding to each regular sub path, and identifying the human-computer interaction movement track of the movement target based on the partitioned areas.

By using the above-mentioned technical solution, various sub paths can be segmented accurately, which provides a basis for detecting a human-computer interaction movement track of a subsequent movement target.

Further, the movement path is generated by:
defining a track shape with a json structure, and defining a width and a display area of a track according to data type of a target to be measured;
dynamically generating an inner frame and an outer frame of the track based on the shape, width and display area of the track; and
obtaining the movement path based on the inner frame and the outer frame of the track.

By adopting the above-mentioned technical solution, the movement path can be generated quickly and accurately. Further, the dynamically generating an inner frame and an outer frame of the track comprise:

retracting or expanding the shape of the track;

acquiring intersection points on parallel edges of an original track figure;

taking the intersection points as end points of a new track figure to obtain each end point of a retracted or expanded polygon; and obtaining the new polygon by connecting each end point of the polygon, completing retracting or expanding of the shape of the track, and dynamically generating the inner frame and the outer frame of the track.

By adopting the above-mentioned technical solution, the inner frame and the outer frame can be generated quickly and accurately.

Further, the obtaining the movement path based on the inner frame and the outer frame of the track comprises:

generating a range and a shape based on the inner frame and the outer frame of the track; and obtaining the movement path based on the range and the shape.

By adopting the above-mentioned technical solution, a precise movement path can be quickly constructed.

In a second aspect of the present application, a human-computer interaction movement track detection device is provided. The device comprises:

a segmenting module for segmenting the movement path to obtain one or more sub paths;

a recording module for monitoring and recording movement of the movement target in each of the sub paths to obtain a human-computer interaction movement track of the movement target in each of the sub paths;

an identifying module for identifying the human-computer interaction movement track of the movement target in each of the sub paths with a determination model corresponding to each of the sub paths; and a detecting module for detecting a human-computer interaction movement track of the movement target based on identification of the human-computer interaction movement track in each of the sub paths.

In a third aspect of the present application, an electronic device is provided. The electronic device comprises: a memory and a processor, the memory having stored thereon a computer program, the processor implementing the method as described above when executing the program.

In a fourth aspect of the present application, there is provided a computer-readable storage medium having stored thereon a computer program which when executed by a processor implements the method according to the first aspect of the present application.

The human-computer interaction movement track detection method provided in the embodiments of the present application comprise obtaining one or more sub paths by segmenting a movement path; monitoring the movement of the movement target in each segment of the sub path and recording same so as to obtain a human-computer interaction movement track of the movement target in each segment of the sub path; identifying a human-computer interaction movement track of the movement target in each of the sub paths via a determination model corresponding to each of the sub paths; completing of the human-computer interaction movement track detection of the movement target based on identification of the human-computer interaction movement track of each sub path, and the situation of the movement target moving out of or touching the wall can be more accurately identified.

It should be understood that the description in the summary of the invention is not intended to limit the key or critical features of the embodiments of the present application, nor is it intended to limit the scope of the present application. Other features of the present application will become readily apparent from the following description.

BRIEF DESCRIPTION OF THE DRAWINGS

The above-mentioned and other features, advantages, and aspects of embodiments of the present application will become more apparent by reference to the following detailed description when taken in conjunction with the accompanying drawings. In the drawings, the same or similar reference numerals denote the same or similar elements.

DETAILED DESCRIPTION

In order that the objects, technical solutions and advantages of the embodiments of the present disclosure will become more apparent, a more clear and complete description of the technical solutions of the embodiments of the present disclosure will be rendered by reference to the appended drawings of the embodiments of the present disclosure, which are provided to illustrate, apparently, some, but not all embodiments of the present disclosure. Based on the embodiments in the present disclosure, all other embodiments obtained by a person of ordinary skill in the art without inventive effort fall within the scope of the present disclosure.

In addition, the term "and/or" herein is merely an association that describes associated objects and indicates that there may be three relationships. For example, A and/or B may indicate that: there are three cases of A alone, A and B together, and B alone. In addition, the word "/", as used herein, generally indicates that the associated objects are of an "or" relationship.

Figure 1:
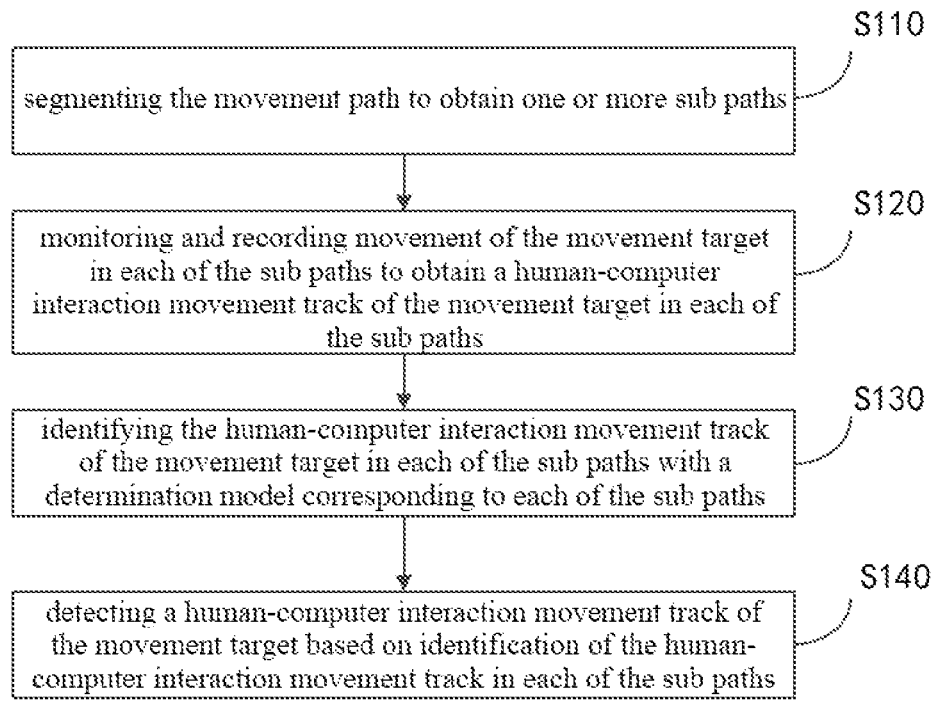
FIG. 1 shows a flowchart of a human-computer interaction movement track detection method according to an embodiment of the present application.

FIG. 1 shows a flowchart of a human-computer interaction movement track detection method according to an embodiment of the present disclosure. The method comprises:

S110, segmenting the movement path to obtain one or more sub paths.

Specifically, the movement path refers to a track in which the movement target moves. The movement path can be constructed by:
defining a track shape by a json structure, and defining a width and a display area of the track according to a data type of the object to be measured; the data type of the object to be measured comprising data related to the movement target, such as various parts of a human body, specifically, such as a hand, a foot and/or a head, etc. which can also be various types of engineering data related to a track, such as a pipeline, etc.

Furthermore, the track shape can be retracted or expanded according to an actual application scenario, and parallel edges of each edge of the original track figure are obtained. End points of a new polygon is obtained according to intersection points of a plurality of parallel edges, and each end point of the polygon expanded or retracted is obtained by analogy, and then a new polygon is obtained by connecting lines thereof, so as to complete the retraction or expansion of the track shape, and an inner frame and an outer frame of the track can be dynamically generated. Specifically, when the intersection points of a plurality of parallel edges are taken as the end points of the new polygon, the distances between each parallel edge and each edge of the corresponding original track figure are equal, so as to ensure that the shape of the retracted or expanded track figure conforms to the shape of the original track figure.

In some embodiments, the range and shape of the track are generated based on the inner frame and the outer frame of the track, described as Bounds and Shapes in the associated software.

If the shape is an arc, a track inner diameter value and a track outer diameter value are determined from a track width, and the bounds are determined from the track inner diameter value, the track outer diameter value, a starting radian value and an ending radian value.

If the shape is a polygon, all the points of the inner and outer contours are wired to determine the bounds. Specifically, the fact that all the points of the inner and outer contours are wired refers to each point on the outer contour being respectively wired to a corresponding point on the inner contour.

Based on the bounds and shapes, a movement path is obtained.

In some embodiments, the movement path is segmented with a pre-created json file to obtain one or more sub paths. The pre-created json file comprises definitions of various sub path.

The sub path comprises a regular sub path and a special figure path formed by combining a plurality of figures. The regular sub path comprise a circle, a triangle, a square, a trapezoid and/or a hexagon, and the various figures may refer to a circle, a triangle, a square, a trapezoid and/or a hexagon.

For example, S-shaped or U-shaped paths are segmented with a pre-created json file.

The S-shaped path can be segmented into a circular arc and a polygon, that is, be segmented into two segments of circular arcs and three segments of line sub path.

S120, monitoring and recording movement of the movement target in each of the sub paths to obtain a human-computer interaction movement track of the movement target in each of the sub paths.

The movement target of the present disclosure generally refers to a pellet formed through simulation by a person to be tested through a test device, or a pellet formed through simulation when fault detection is performed, etc. The pellets can be used to simulate a body part such as a hand, foot and/or head of a person to be tested.

Further, the diameter of the pellets can be adjusted according to the actual measurement scenario.

In some embodiments, the movement of the movement target in each of the sub paths is monitored in real time, and the human-computer interaction movement track of the movement target in each of the sub paths is obtained by recording the human-computer interaction track of the movement target.

S130, identifying the human-computer interaction movement track of the movement target in each of the sub paths with a determination model corresponding to each of the sub paths.

In some embodiments, the corresponding determination model is selected according to the type of each sub path, and the human-computer interaction movement track of a movement target in each of the sub paths is identified.

Figure 2:
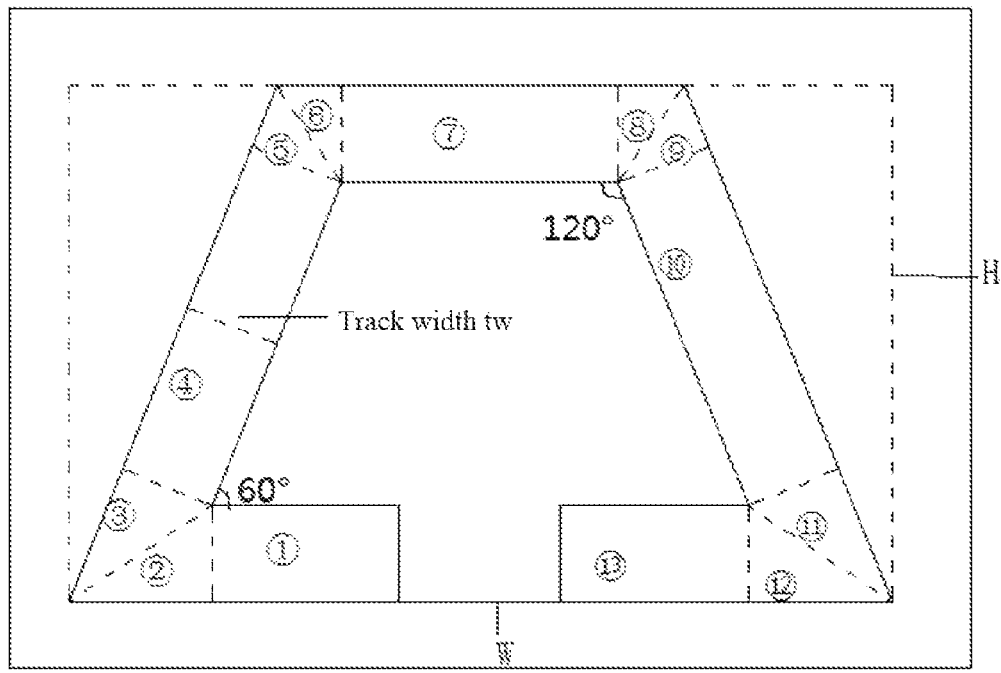
FIG. 2 shows a segmenting schematic view of a trapezoidal path according to an embodiment of the present application.

With reference to FIG. 2, if the sub path is a trapezoid, the trapezoid is partitioned according to each the vertex coordinate thereof to obtain a plurality of sub areas, and the segmenting method thereof comprises making vertical lines from an inner vertex to an outer vertex (the segmentation method for other figures may refer to the segmentation method for a trapezoid fig ureic), and respectively identifying the human-computer interaction movement track of the movement target in each sub area.

Bottom base of outer trapezoid=$w$;

Top base of outer trapezoid=$w-(H/\tan 60° \times 2)$;

Bottom base of inner trapezoid=bottom base of outer trapezoid$-tw/\sin 60° \times 2$;

Top base of inner trapezoid=bottom base of inner trapezoid $$\frac{(H - 2 \times tw)}{\tan 60°} \times 2.$$

In step a, the coordinate of each vertex of the trapezoid is calculated.

Figure 3:
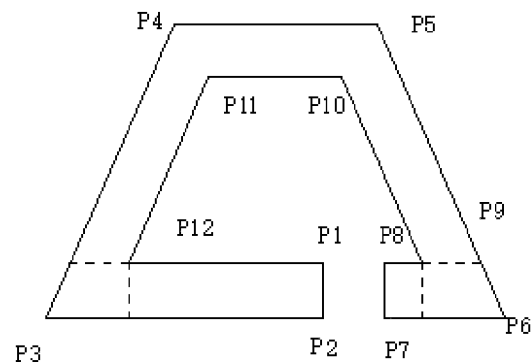
FIG. 3 shows a schematic view of vertex coordinates of a trapezoidal path according to an embodiment of the present application.

The upper and lower included angles are respectively 120° and 60°, equidistant vertical lines are made outwards along the inner vertex angle of the trapezoid, and the inner and outer vertex angles are connected to obtain partitioned figures ①-⑬. The intersection point of the extension lines of the vertex P3 in the X-axis direction and the vertex P4 in the Y-axis direction are taken as the origin, and the origin coordinate is (0.0), and the corresponding coordinate of each vertex is calculated, with reference to FIG. 3:

$P1 = (\frac{w}{2} - d, H - tw)$;

$P2 = (\frac{w}{2} - d, H)$;

$P3=(0,H)$;

$P4=(H/\tan 60°,0)$;

$P5=(H/\tan 60°+\text{top base of outer trapezoid},0)$;

$P6=(W,H)$;

$$P7 = (\frac{w}{2} + d, H);$$

$$P8 = (\frac{w}{2} + d, H - tw);$$

$$P9 = (\frac{w}{2} + \frac{\text{bottom base of inner trapezoid}}{2} - d, H - tw);$$

$$P10 = (\frac{w}{2} + \frac{\text{bottom base of inner trapezoid}}{2}, tw);$$

$$P11 = (\frac{w}{2} - \frac{\text{bottom base of inner trapezoid}}{2}, tw);$$

$$P12 = (\frac{w}{2} - \frac{\text{bottom base of inner trapezoid}}{2} + d, H - tw).$$

In step b, the rectangular areas 1, 4, 7, 10, 13 are partitioned into a plurality of small pieces at intervals of d. Specifically, a plurality of pieces partitioned at intervals of d are sequentially arranged from a starting position of the track to an ending position of the track.

In step c, the human-computer interaction movement track of the movement target in each of the sub paths is identified, namely, it is determined whether the target is in a trapezoidal track.

In step (1): it is determined whether the center of the circle of the movement target is in a large trapezoid (namely, an outer trapezoid);

In step (2): if it is determined as "in" in step (1), it is circularly determined in which small area the movement target is located that corresponds to the partitioned figures ①-⑬, and finding an index corresponding to the small area;

In step (3), if the determination of the small area is completed in step (2), the nearest distance the circle of the movement target in the polygon (corresponding to the small area) is determined; if the distance is greater than or equal to the radius of the movement target, the distance is in the track; otherwise, the distance is out of the track. Specifically, the closest distance of the center of the circle of the movement target in the polygon (corresponding to the small area) refers to the closest distance in the perpendicular distance from the center of the circle of the movement target to the position corresponding to the small area in the inner trapezoidal track or the outer trapezoidal track;

Step (4): if the movement target is in a triangular area (such as areas 2, 3, 5, 6, 8, 9, 11 and 12) at corner, an index of the triangle is marked. If the movement target is in the area of a rectangle, a distance from the center of the circle of the movement target to a starting edge is calculated, specifically, the starting edge refers to a boundary of the rectangular area through which the movement target enters the area of the rectangle, where the distance of the center of circle of the movement target from the starting edge divided by d is equal to the index by which the movement target is offset within the rectangular area.

Figure 4:
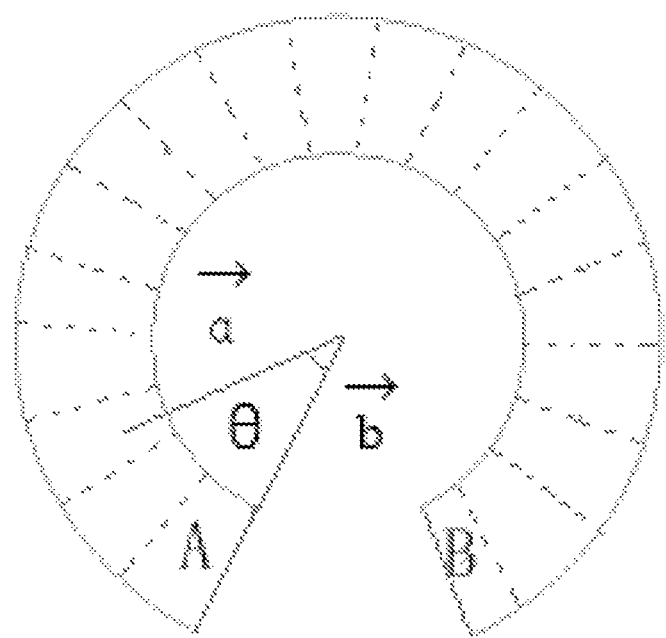
FIG. 4 shows a segmenting schematic view of a circular path according to an embodiment of the present application.

With reference to FIG. 4, if the sub path is circular, a corresponding display area is set, which is represented in software as Area, the track width is w, and the diameter of a pellet c corresponding to the movement target is greater than d.

The target starts from point A, and moves from point A (a starting point) to point B (an ending point) to mark the correct section and the wrong section of the movement of the movement target in the track, namely, identifies the human-computer interaction movement track of the movement target in each of the sub paths, comprising:

1, segmenting the circular track into small segments equally, the walking distance of each segment being d, calculating a starting radian value and an ending radian value based on the radian interval corresponding to each small segment, and calculating the shape and size of each small segment according to the radian value offset, wherein the walking distance d refers to the distance that the center of circle of the movement target walks in each segment under the condition that the movement target keeps moving centrally in the circular track, namely, under the condition that the distance between the center of circle of the movement target and the outer diameter of the circular track and the distance between the center of circle of the movement target and the inner diameter of the circular track always keep consistent during the movement.

Specifically, during the calculation, the parameters are set as follows:

$$\text{Center of cicrle } c = (\frac{\text{area.}W}{2}, \frac{\text{area.}H}{2}),$$

wherein area represents a display area;
area·W indicates the width of the display area;
area·H indicates the height of the display area;

Gap $g = 2d$;

Circular track outer diameter $r1 = \text{height}/2$;

Circular track outer diameter $r2 = r1 - w$;

$$P9 = (\frac{w}{2} + \frac{\text{bottom base of inner trapezoid}}{2} - d, H - tw);$$

$$P10 = (\frac{w}{2} + \frac{\text{bottom base of inner trapezoid}}{2}, tw);$$

$$P11 = (\frac{w}{2} - \frac{\text{bottom base of inner trapezoid}}{2}, tw);$$

$$P12 = (\frac{w}{2} - \frac{\text{bottom base of inner trapezoid}}{2} + d, H - tw).$$

In step b, the rectangular areas 1, 4, 7, 10, 13 are partitioned into a plurality of small pieces at intervals of d. Specifically, a plurality of pieces partitioned at intervals of dare sequentially arranged from a starting position of the track to an ending position of the track.

In step c, the human-computer interaction movement track of the movement target in each of the sub paths is identified, namely, it is determined whether the target is in a trapezoidal track.

In step (1): it is determined whether the center of the circle of the movement target is in a large trapezoid (namely, an outer trapezoid);

In step (2): if it is determined as "in" in step (1), it is circularly determined in which small area the movement target is located that corresponds to the partitioned figures ①-⑬, and finding an index corresponding to the small area;

In step (3), if the determination of the small area is completed in step (2), the nearest distance the circle of the movement target in the polygon (corresponding to the small area) is determined; if the distance is greater than or equal to the radius of the movement target, the distance is in the track; otherwise, the distance is out of the track. Specifically, the closest distance of the center of the circle of the movement target in the polygon (corresponding to the small area) refers to the closest distance in the perpendicular distance from the center of the circle of the movement target to the position corresponding to the small area in the inner trapezoidal track or the outer trapezoidal track;

Step (4): if the movement target is in a triangular area (such as areas 2, 3, 5, 6, 8, 9, 11and 12) at corner, an index of the triangle is marked. If the movement target is in the area of a rectangle, a distance from the center of the circle of the movement target to a starting edge is calculated, specifically, the starting edge refers to a boundary of the rectangular area through which the movement target enters the area of the rectangle, where the distance of the center of circle of the movement target from the starting edge divided by d is equal to the index by which the movement target is offset within the rectangular area.

With reference to FIG. 4, if the sub path is circular, a corresponding display area is set, which is represented in software as Area, the track width is w, and the diameter of a pellet c corresponding to the movement target is greater than d.

The target starts from point A, and moves from point A (a starting point) to point B (an ending point) to mark the correct section and the wrong section of the movement of the movement target in the track, namely, identifies the human-computer interaction movement track of the movement target in each of the sub paths, comprising:

1, segmenting the circular track into small segments equally, the walking distance of each segment being d, calculating a starting radian value and an ending radian value based on the radian interval corresponding to each small segment, and calculating the shape and size of each small segment according to the radian value offset, wherein the walking distance d refers to the distance that the center of circle of the movement target walks in each segment under the condition that the movement target keeps moving centrally in the circular track, namely, under the condition that the distance between the center of circle of the movement target and the outer diameter of the circular track and the distance between the center of circle of the movement target and the inner diameter of the circular track always keep consistent during the movement.

Specifically, during the calculation, the parameters are set as follows:

$$\text{Center of cicrle } c = (\frac{\text{area.}W}{2}, \frac{\text{area.}H}{2}),$$

wherein area represents a display area;
area·W indicates the width of the display area;
area·H indicates the height of the display area;

Gap $g=2d$;

Circular track outer diameter $r1=\text{height}/2$;

Circular track outer diameter $r2=r1-w$;

The moving track of the movement target corresponds to the corresponding walking radius $$r = r1 - \frac{w}{2};$$

The walking length corresponding to the movement track of the movement target$=2\pi r - g$;

The circle is equally segmented into small segments, the walking distance of each segment is d, and the radian interval corresponding to each small segment is $$\text{rad} = \frac{1}{\pi};$$

Starting radian $$s\text{rad} = \frac{1}{\pi};$$

Ending radian $$e\text{rad} = 2\pi - \frac{1}{\pi};$$

The shape and size of each small block (area) are calculated according to the radian offset.

2, determining whether the target pellet moves out during walking, comprising:
  (1) taking the track as a whole to determine whether the center of the sphere appears in the track;
  (2) determining whether the radius of the center of the sphere is greater than the outer diameter or not, and if so, it is determined as moving out of the track;
  (3) determining whether the radius of the center of the sphere is less than the inner diameter or not, and if so, it is determined as moving out of the track.

3, if the center of the sphere appears in the track, determining which block the pellet is in, and the small block is marked as correct or wrong, comprising:
  (1) calculating the included angle between two vectors (radian value of included angle);

$\theta = a\tan 2(\vec{a}\cdot y, \vec{a}\cdot x) - a\tan 2(\vec{b}\cdot y, \vec{b}\cdot x)$;

wherein a tan 2 is a function representing an azimuth angle;
  X represents a floating point value of the x-axis coordinate;
  Y represents a floating point value of the y-axis coordinate;
  the vector $\vec{a}$ and $\vec{b}$ respectively represent the length from the center of the circle to the inner arc as shown in FIG. 4.
  (2) dividing the included angle of the vectors by the radian interval to obtain an index, namely, $$\text{index} = \frac{\theta}{\text{rad}};$$

the index is used for representing the i-th sub path segmented by a dotted line as shown in FIG. 4; the value range of the i is determined according to the number of sub paths ($1 \leq i \leq$ the number of sub paths); the current index is compared with the last index, and it is marked as correct if the absolute value of the difference between the current index and the last index is 1, otherwise it is marked as wrong.

Figure 5:
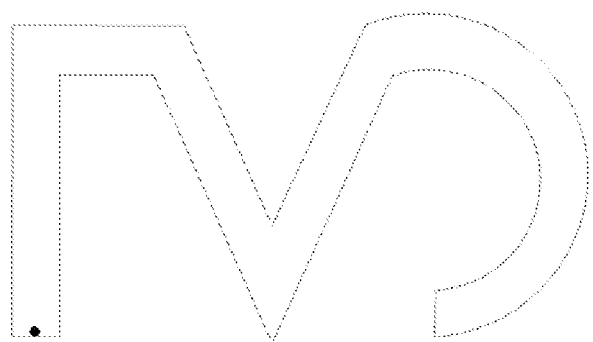
FIG. 5 shows a schematic view of a special figure according to an embodiment of the present application.

If the sub path is a special figure as shown in FIG. 5, i.e. consists of a segment of a circular arc and a segment of a polyline, the track is generated by the Json data as a combination of a trapezoid and a circle.

The determining method is as follows:
1, determining whether a target is in a polyline;
2, determining whether a target is in a circular arc;
3, forming the last segment of the polyline and the first segment of the circular arc into a new polygon, and determining whether the target is within the polygon;
4, if none of 1, 2 and 3 is determined as true, it is determined as being out of track (collision, abnormal movement); the above-mentioned determining methods of 1, 2 and 3 can be referred to the determining methods of trapezoid and circle, which will not be described in detail herein.

Further, for the calculation of the regular sub path and other special figures formed by combining various figures, reference is made to the calculation of the trapezoidal, circular, and special figure paths described above. For example, the square is partitioned into eight areas (four corner segments and four straight line segments), and the segments identify the human-computer interaction movement track of the target, namely, determining whether the movement of the target in each area is normal. If there is no collision, it is normal, otherwise, it is abnormal.

Further, the area where the target normally moves and the area where the target does not normally move (hitting the wall or exiting the track) can be marked with different colors. For example, the area of normal movement is marked as gray. Areas of abnormal movement are marked in red.

S140, detecting a human-computer interaction movement track of the movement target based on identification of the human-computer interaction movement track in each of the sub paths.

In some embodiments, all identifications of the human-computer interaction movement track of the movement target in the movement path are summarized, the proportion of abnormal movement areas in the identifications of the human-computer interaction movement track is counted, and the detection of the human-computer interaction movement track of the movement target is completed according to the proportion. For example, when a user's hand track is detected, if the percentage of an abnormal movement area is more than 70% (which can be evaluated according to large data analysis, manual experience, etc.), it indicates that the user's movement coordination is poor, and an exercise program is provided to the user according to the age of the tester and the abnormal movement area, etc.

It should be noted that the above-mentioned method is only described from a single side (one hand and one foot). In practical applications, in order to more accurately measure the user's movement coordination, a plurality of paths matched with each other can be set to detect the user's coordination (coordination detection under a specific task). For example, when measuring the coordination of the user's right hand and left foot, the movement path of the hand is U, and the movement path of the foot is S, the percentage of abnormal movement areas of the user's hand and foot can be respectively counted in combination with large data analysis and manual experience, etc. to provide a final evaluation result.

According to the embodiments of the present disclosure, the following technical effects are achieved.

It can quickly and comprehensively evaluate the coordination evaluation index of human under specific tasks, solve the problem that the coordination degree of different areas of human body cannot be objectively quantified in the process of human movement, and then make up the blank of objective quantification of human coordination.

At the same time, the method of the present disclosure can be applied to a scene where the accessible diameter is small or the measurement accuracy is high, making up for the defect of the sensor measurement method.

It should be noted that for simplicity of explanation, each of the foregoing method embodiments has been presented as a series of combinations of acts, but those skilled in the art will recognize that the present application is not limited by the order of acts described, as some steps may, in accordance with the present application, be performed in other orders or concurrently. Secondly, a person skilled in the art would also know that the embodiments described in the description are all alternative embodiments, and the actions and modules involved are not necessarily required by the present application.

The regard to the above-mentioned description of method embodiments, the solution described in the present application is further illustrated below by means of device embodiments.

Figure 6:
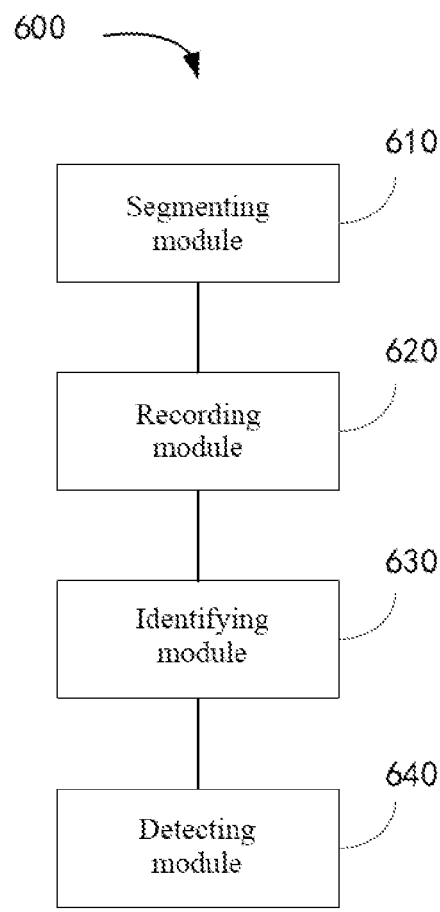
FIG. 6 shows a block diagram of a human-computer interaction movement track detection device according to an embodiment of the present application.

FIG. 6 shows a block diagram of a human-computer interaction movement track detection device 600 according to an embodiment of the present application. As shown in FIG. 6, the device 600 includes:
- a segmenting module 610 for segmenting a movement path to obtain one or more sub paths;
- a recording module 620 for monitoring and recording the movement of the movement target in each segment of the sub path so as to obtain a human-computer interaction movement track of the movement target in each segment of the sub path;
- an identifying module 630 for identifying the human-computer interaction movement track of the movement target in each of the sub paths through a determination model corresponding to each of the sub paths; and
- a detecting module 640 for completing the human-computer interaction movement track detection on the movement target based on identification of the human-computer interaction movement track of each of the sub paths.

It will be clear to a person skilled in the art that, for the convenience and brevity of the description, specific working procedures of the described modules may be referred to the corresponding procedures in the preceding method embodiments and will not be described in detail here.

Figure 7:
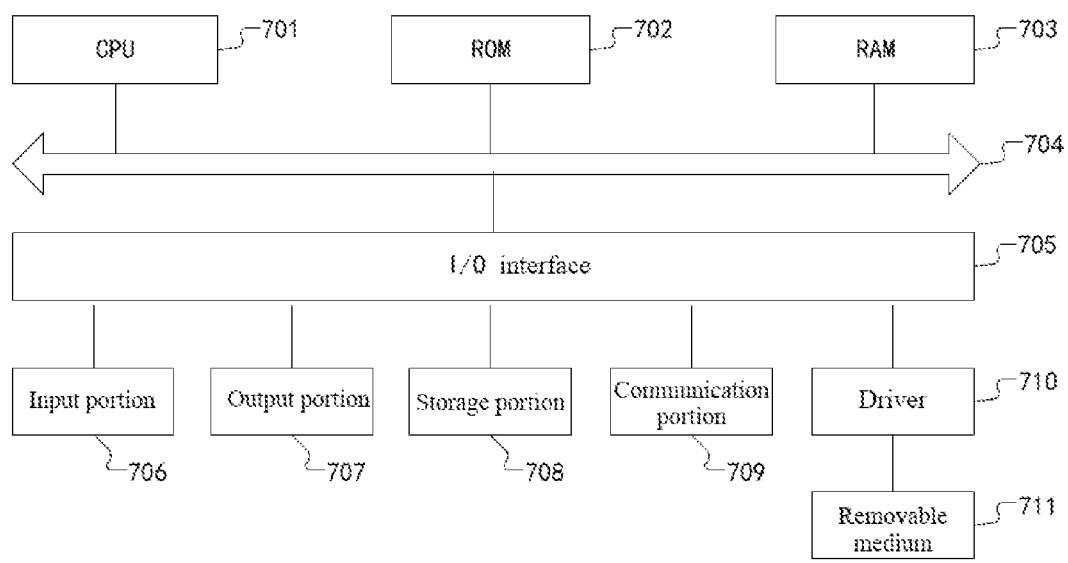
FIG. 7 shows a schematic structural diagram of a terminal device or server suitable for implementing an embodiment of the present application.

FIG. 7 shows a schematic structural diagram of a terminal device or server suitable for implementing an embodiment of the present application.

As shown in FIG. 7, the terminal device or server includes a central processing unit (CPU) 701, which can perform various appropriate actions and processes according to a program stored in a read-only memory (ROM) 702 or a program loaded from a storage portion 708 into a random access memory (RAM) 703. In the RAM 703, various programs and data required for the operation of the terminal device or the server are also stored. The CPU 701, the ROM 702 and the RAM 703 are connected to each other via a bus 704. An input/output (I/O) interface 705 is also coupled to bus 704.

The following components are connected to the I/O interface 705: an input portion 706 including a keyboard, a mouse, etc.; an output portion 707 such as a cathode ray tube (CRT), a liquid crystal display (LCD), etc. and a speaker, etc.; a storage portion 708 comprising a hard disk or the like; and a communication portion 709 including a network interface card such as a LAN card, modem, etc. The communication portion 709 performs communication processing via a network such as the Internet. A driver 710 is also connected to I/O interface 705 as needed. A removable medium 711, such as a magnetic disk, optical disk, magneto-optical disk, semiconductor memory or the like, is mounted on the driver 710 as required so that a computer program read therefrom is mounted into the storage portion 708 as required.

In particular, the above-mentioned method flow steps may be implemented as a computer software program according to an embodiment of the present application. For example, embodiments of the present application include a computer program product comprising a computer program embodied on a machine-readable medium, the computer program comprising program code for performing the methods illustrated in the flowcharts. In such an embodiment, the computer program may be downloaded and installed from the network via the communication portion 709 and/or from the removable medium 711. The computer program, when executed by the central processing unit (CPU) 701, performs the functions defined above in the system of the present application.

Note that the computer-readable medium described herein can be either a computer-readable signal medium or a computer-readable storage medium or any combination thereof. The computer-readable storage medium can be, for example but not limited to, an electronic, magnetic, optical, electromagnetic, infrared, or semiconductor system, device or means, or a combination of any of the foregoing. More specific examples of computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this application, a computer-readable storage medium may be any tangible medium that can contain or store a program for use by or in connection with the instruction execution system, device or means. In this application, the computer-readable signal medium may comprise a data signal embodied in baseband or propagated as part of a carrier wave, wherein the data signal carries computer-readable program code. Such propagated data signals may take many forms, including but not limited to electromagnetic signals, optical signals, or any suitable combination of the preceding. The computer-readable signal medium may also be any computer-readable medium other than a computer-readable storage medium that can send, propagate, or transport the program for use by or in connection with the instruction execution system, device or means. The program code embodied on the computer readable medium may be transmitted over any suitable medium including, but not limited to: wireless, wire, fiber optic cable, RF, and the like, or any suitable combination of the foregoing.

The flowcharts and block diagrams in the drawings illustrate the architecture, functionality, and operation of possible implementations of systems, methods, and computer program products according to various embodiments of the present application. In this regard, each block in the flowchart or block diagrams may represent a module, a program segment, or s portion of code, which comprises one or more executable instructions for implementing the specified logical function(s). It should also be noted that in some alternative implementations, the functions noted in the blocks may occur out of the order noted in the figures. For example, two blocks shown in succession may, in fact, be executed substantially in parallel, and sometimes in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The elements or modules described in connection with the embodiments disclosed herein may be implemented in software or hardware. The units or modules described may also be provided in a processor. The names of the units or modules do not in some cases constitute a limitation on the unit or module itself.

As another aspect, the present application also provides a computer-readable storage medium, which may be included in the electronic device described in the above-mentioned embodiments. It may also be present separately and not fitted into the electronic device. The computer-readable storage medium stores one or more programs that when used by one or more processors perform the methods described herein.

The foregoing description is merely illustrative of the preferred embodiments of the present application and of the principles of the technology employed. It will be understood by those skilled in the art that the scope of application referred to in this application is not limited to the particular combination of features described above, but is intended to include the technical solutions formed by any combination of features described above or their equivalents without departing from the spirit of the invention. For example, the above-mentioned features and the technical features with similar functions applied in the present application (but not limited to) can be replaced with each other to form a technical solution.

What is claimed is:

1. A human-computer interaction movement track detection method, comprising:
    segmenting a movement path of a movement target to obtain one or more sub paths;
    monitoring and recording movement of the movement target in each of the one or more sub paths to obtain a human-computer interaction movement track of the movement target in each of the one or more sub paths;
    identifying the human-computer interaction movement track of the movement target in each of the one or more sub paths with a determination model corresponding to each of the one or more sub paths; and
    detecting a human-computer interaction movement track of the movement target based on identification of the human-computer interaction movement track in each of the one or more sub paths,
    wherein, the segmenting a movement path of a movement target to obtain one or more sub paths comprises:
        segmenting the movement path with a pre-created json file to obtain the one or more sub paths, wherein the pre-created json file contains definitions of various types of sub paths, and
    wherein, each of the one or more sub paths comprises a regular sub path and a special figure sub path formed by combining various figures, and the regular sub path comprises at least one of a circle, a triangle, a square, a trapezoid or a hexagon.

2. The method according to claim 1, wherein, the identifying the human-computer interaction movement track of the movement target in each of the one or more sub paths with a determination model corresponding to each of the one or more sub paths comprises:
  when a sub path of the one or more sub paths is a trapezoid, partitioning the trapezoid according to each of vertex coordinates thereof to obtain a plurality of sub areas, and respectively identifying the human-computer interaction movement track of the movement target in each of the plurality of sub areas;
  when a sub path of the one or more sub paths is a circle, segmenting the circle into a plurality of segments equally, and determining shape and size of each segment of the plurality of segments according to a length, starting radian and ending radian of each segment of the plurality of segments; identifying the human-computer interaction movement track of the movement target based on the shape and size of each segment of the plurality of segments;
  when a sub path of the one or more sub paths is a triangle, partitioning the triangle according to each of vertex coordinates of the triangle to obtain a plurality of sub areas, and identifying the human-computer interaction movement track of the movement target according to the plurality of sub areas;
  when a sub path of the one or more sub paths is a square, partitioning the square into a plurality of rectangular areas, and respectively identifying the human-computer interaction movement track of the movement target in each rectangular area of the plurality of rectangular areas; and
  when a sub path of the one or more sub paths is a special figure path, segmenting the special figure path into a plurality of regular sub paths; partitioning the plurality of regular sub paths according to the determination model corresponding to each regular sub path of the plurality of regular sub paths to yield partitioned areas, and identifying the human-computer interaction movement track of the movement target based on the partitioned areas.

3. The method according to claim 2, wherein, the movement path is generated by:
  defining a track shape with a json structure, and defining a width and a display area of a track according to data type of a target to be measured;
  dynamically generating an inner frame and an outer frame of the track based on the track shape, width and display area of the track; and
  obtaining the movement path based on the inner frame and the outer frame of the track.

4. The method according to claim 3, wherein, the dynamically generating an inner frame and an outer frame of the track comprises:
  retracting or expanding the track shape of the track;
  acquiring intersection points on parallel edges of an original track figure;
  taking the intersection points as end points of a new track figure to obtain each end point of a retracted or expanded polygon; and
  obtaining a new polygon by connecting each end point of the retracted or expanded polygon, completing retracting or expanding of the track shape of the track, and dynamically generating the inner frame and the outer frame of the track.

5. The method according to claim 4, wherein, the obtaining the movement path based on the inner frame and the outer frame of the track comprises:
  generating a range and a shape based on the inner frame and the outer frame of the track; and
  obtaining the movement path based on the range and the shape.

6. A human-computer interaction movement track detection device, comprising:
  a segmenting module for segmenting a movement path with a pre-created json file to obtain one or more sub paths, wherein the pre-created json file contains definitions of various types of sub paths;
  a recording module for monitoring and recording movement of a movement target in each of the one or more sub paths to obtain a human-computer interaction movement track of the movement target in each of the one or more sub paths;
  an identifying module for identifying the human-computer interaction movement track of the movement target in each of the one or more sub paths with a determination model corresponding to each of the one or more sub paths; and
  a detecting module for detecting a human-computer interaction movement track of the movement target based on identification of the human-computer interaction movement track in each of the one or more sub paths,
  wherein, each of the one or more sub paths comprises a regular sub path and a special figure sub path formed by combining various figures, and the regular sub path comprises at least one of a circle, a triangle, a square, a trapezoid or a hexagon.

7. An electronic device, comprising: a processor and a memory with a computer program stored thereon, wherein the processor is configured to execute the computer program to implement a human-computer interaction movement track detection method, and the method comprises:
  segmenting a movement path of a movement target to obtain one or more sub paths;
  monitoring and recording movement of the movement target in each of the one or more sub paths to obtain a human-computer interaction movement track of the movement target in each of the one or more sub paths;
  identifying the human-computer interaction movement track of the movement target in each of the one or more sub paths with a determination model corresponding to each of the one or more sub paths; and
  detecting a human-computer interaction movement track of the movement target based on identification of the human-computer interaction movement track in each of the one or more sub paths,
  wherein, the segmenting a movement path of a movement target to obtain one or more sub paths comprises:
    segmenting the movement path with a pre-created json file to obtain the one or more sub paths, wherein the pre-created json file contains definitions of various types of sub paths, and
  wherein, each of the one or more sub paths comprises a regular sub path and a special figure sub path formed by combining various figures, and the regular sub path comprises at least one of a circle, a triangle, a square, a trapezoid or a hexagon.

* * * * *